United States Patent [19]

Romeo

[11] 4,268,388
[45] May 19, 1981

[54] SYSTEM FOR WASTE DISPOSAL

[76] Inventor: Samuel T. Romeo, 100 Tower Dr., Stevensville, Md. 21666

[21] Appl. No.: 116,537

[22] Filed: Jan. 29, 1980

Related U.S. Application Data

[63] Continuation-in-part of Ser. No. 101,831, Dec. 10, 1979.

[51] Int. Cl.³ .......................... B01D 37/02; F23G 7/04
[52] U.S. Cl. .................................. 210/180; 210/195.2; 210/199; 210/259; 210/241; 110/238
[58] Field of Search ...................... 210/73, 56, 71, 59, 210/195.1, 199, 180, 259, 60, 121, 774, 804, 806, 241; 159/1 RW, 44; 110/238

[56] References Cited

U.S. PATENT DOCUMENTS

| | | | |
|---|---|---|---|
| 1,967,197 | 7/1934 | Besselievre | 210/3 |
| 3,256,178 | 6/1966 | Teletzke et al. | 210/3 |
| 3,359,200 | 12/1967 | Gitchel et al. | 210/63 |
| 3,864,252 | 2/1975 | Morin et al. | 210/59 |
| 4,026,223 | 5/1977 | Robbins | 110/7 B |

Primary Examiner—Ernest G. Therkorn
Assistant Examiner—E. Rollins Cross
Attorney, Agent, or Firm—John F. McClellan, Sr.

[57] ABSTRACT

Flammable waste material and nonflammable waste material are concurrently treated in the apparatus. Flammable waste material such as oil-contaminated solids and liquids is treated by a system which in a first stage reduces the material to small particles mixed and soaked with water, then in a second stage countersprays the mixture into an oil or gas fired flame in a furnace enclosure to explode as steam the water content and consume the particles fragmented by the explosion; in a third stage any particles which are not consumed fall into a flaming pit of sand where they remain in combustion until the pit is slid out for cleaning; vapor, smoke and fumes pass from the second stage through chemical shower, water spray and forced-air stages into a vertical filter stage where coarse filtrate slides into a vat and into a horizontal filter stage in an upward chimney where a counterflow of water spray coacts to purify the exhaust and return fine filtrate into the vat; recirculation of the vat material is provided. Concurrently with the above process, nonflammable waste material is mixed with water and sprayed onto a hot plate; the resulting gaseous material then joins vapor smoke and fumes of the flammable waste material for treatment in the chemical shower and succeeding stages.

3 Claims, 4 Drawing Figures

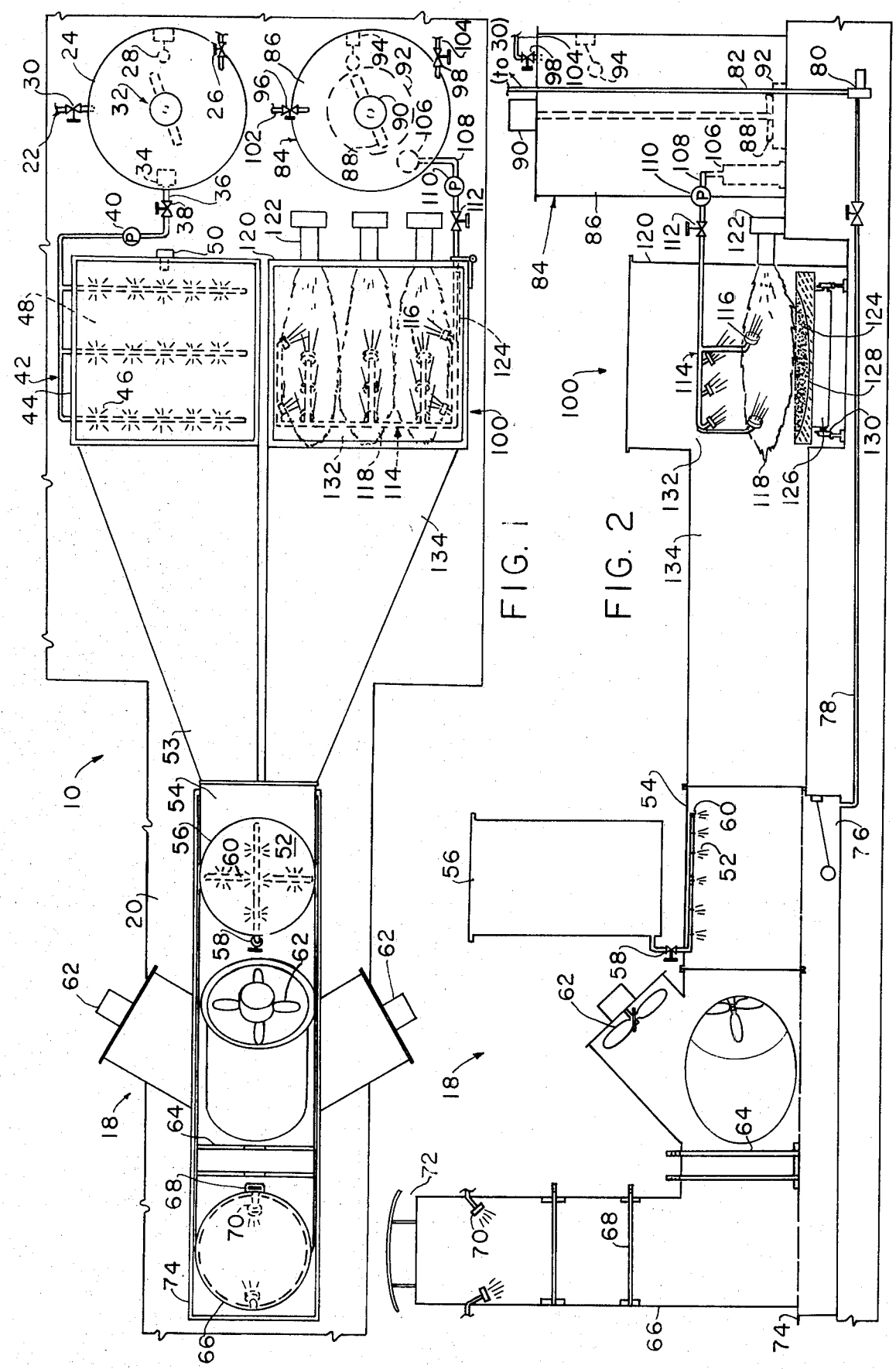

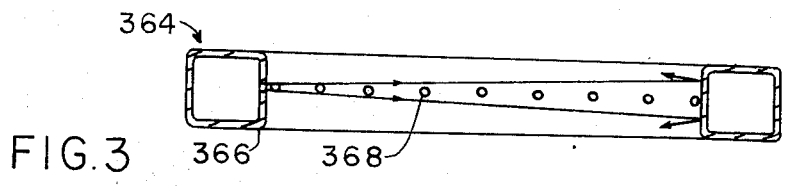
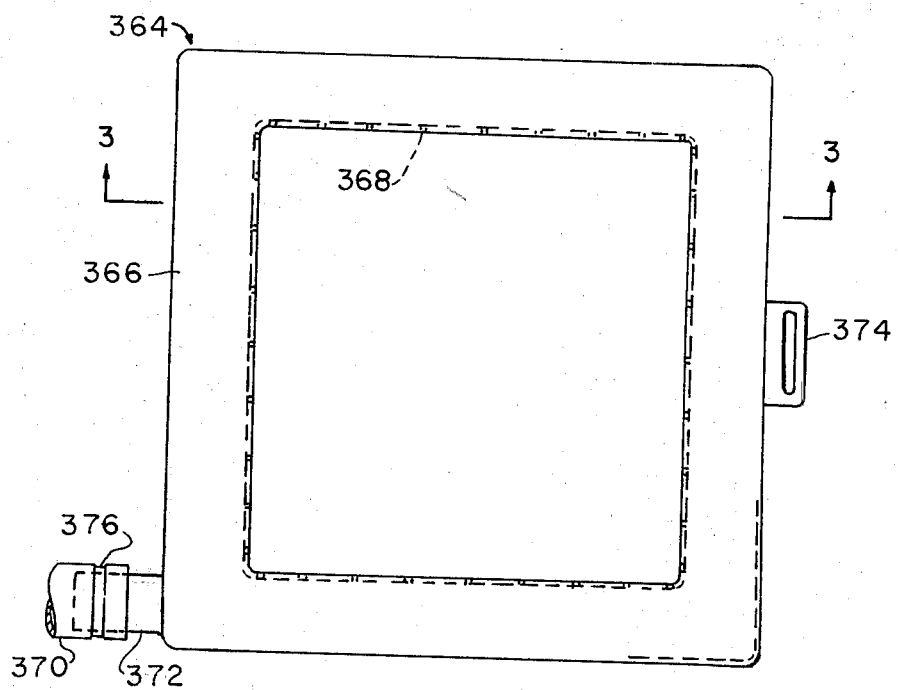

SYSTEM FOR WASTE DISPOSAL

This application is a continuation-in-part of my co-pending application, WASTE DISPOSAL SYSTEM, filed Dec. 10, 1979, Ser.No. 101,831.

This invention relates generally to waste handling systems and particularly to a system for treating oil-based wastes including paints.

Disposal of contaminated and contaminating waste is one of the severe problems of our time. Traditional open burning is inefficient and pollutes the air with combustion products while polluting groundwater with runoff of incompletely consumed but substantially still chemically active residue.

My copending application includes in combustion a system for mixing waste with water, spraying the mixture onto a hot sheet for instantaneously steam-exploding the individual sprayed droplets and vaporizing them, means for passing the vaporized mixture through a chemical spray bath, means for filtering the chemically treated vapor mixture against the flow of a water spray into the atmosphere, and means for returning and recycling solid and excess liquid material from the filtering through the system together with residue of the chemical spray.

The present invention is directed to a proposed sub-system usable in coaction with the later stages of the proposed prior invention.

A principal object of this invention is to provide a new, highly efficient but economical system for concurrently reducing and disposing of both non-inflammable and flammable waste, including oil-based wastes such as contaminated grease and oil and oil-based paints and the like and other liquifiable or liquid-transportable materials of that nature which are combustible but which may be resistant to complete combustion.

In brief summary given as cursory description only and not as limitation the invention includes a system for reducing oil and oily paint waste and the like to finely divided matter intimately mixed and permeated with water, and in this form introducing it as a counter spray into the face of a burner flame to atomize it by steam explosion and to consume the readily combustible portions, followed by continued combustion of less readily combustible portions in a sand pit below; vapor and fumes pass through a chemical spray and moved by explosion and forced air pass through vertical filters and against a water spray pass upwardly through horizontal filters and out to the atmosphere; a catchall vat is included in a subsystem for recirculating residues; matrix-free filter structure is an option.

The above and other objects and advantages of this invention will become more readily evident on examination of the following description, including the drawings in which like reference numerals refer to like parts:

FIG. 1 is a plan diagram;

FIG. 2 is a side elevational diagram adapted from FIG. 1;

FIG. 3 is a cross-sectional view taken at 3—3, FIG. 4 of a filter of an optional embodiment; and FIG. 4 is an elevational view of the FIG. 3 filter.

This invention preferably is used in co-action with the invention of my prior-filed application, as a stage of that system, but it need not be and according to an object hereof can provide a useful result as a separate system even though the combined result is preferable.

PORTION OF THE SYSTEM PREVIOUSLY DESCRIBED

FIG. 1 shows the invention 10 as a coacting system; including at the upper part fragmentarily and continuing to the lefthand part, part 18 of my previous invention. This part, as well as the remainder of the entire system, rests on a concrete pad 20.

Water soluble waste material and/or a water slurry of waste, neither of which is necessarily combustible in whole or in part, is pumped into the system at 22, the mixing stage. Tank 24 shown can be alone or can be one of plural, similar units in series or in parallel. Conventional solenoid valve 26 admits water and conventional solenoid valve float control 28 can be used to control mixture level in the tank, including control of waste intake solenoid valve at 30, also conventional.

Agitator assembly 32 stirs and charges the waste with water. In the bottom of the mixing tank a filtering outlet 34 introduces the water charged waste to a line 36 then through a suitable shut-off valve 38 by gravity or by pump 40 into a spraying system 42, in a chamber 44 where the spray 46 falls onto a plate 48 kept white hot by a conventional burner 50 below it.

The spray instantly vaporizes, subdividing water-charged particles and carrying the sub-divided particles with it. Expansion of the waste as result of vaporization causes it to flow out of the otherwise closed chambers.

In addition to FIG. 1, FIG. 2 diagrams in elevational view the system from this point on, as previously disclosed. The vapor passes through a chemical spray bath 52 in a duct system 53, 54 connecting with the chamber and passing below a chemical tank 56 with valved connection 58 to the chemical spray head 60.

Beyond the chemical spray head, fans 62 inject air into the duct at top and sides carrying the vapor and entrained particulate matter into one or more vertical filters 64 from which coarser matter can slough-off downward under gravity, and then passing the vapor upward in a vertical duct or chimney 66 containing one or more horizontal filters 68 through which the vapor rises against a counterflow or downward water spray from nozzles 70, and then exhausts to the atmosphere at outlet 72 (FIG. 2).

A vat 74, beneath the system from the chamber on, collects filtrate and excess liquid from the sprays and returns it for recirculation to the waste mixing stage at tank 24 through a sump 76, line 78, pump 80 and further line 82 to intake 30.

NEW CO-ACTING PORTION OF SYSTEM

FIG. 1 at the lower right shows the new portion 100 of the system, and FIG. 2 shows at the right this portion in elevational diagram. This portion is designed to handle combustible or partially combustible wastes, emulsions and slurrys, of an oily nature particularly.

The mixing stage 84 can have one or more series, or parallel-connected tanks 86, depending on flow requirements, which are supplied with water and waste to be charged with water as by mixing or grinding or emulsifying using conventional equipment represented by blade 88 driven by motor 90 and acting against millstone 92. Float switch 94 controls mixer liquid level in conventional manner through solenoid valves 96, 98 in the water line 102 and the waste line 104 respectively.

Output through sump filter 106, line 108, pump 110 and valve 112, is to a conventional spray head 114, as above consisting of a multiplicity of nozzles 116.

The nozzles are directed to counterspray against flame 118 blown horizontally downstream in a chamber 120 by a forced draft burner or burners 122, and preferably include nozzles 124 in the sprayhead on both sides of the flame as well as the top, but not the bottom.

Sufficient air for combustion may be admitted at the burner in every case, if desired.

Forces of the spray and the flame pressure are balanced as by valve 112 so that the spray is ignited and combustible material is consumed, at least in part, as the water explosively is vaporized and disintegrates the combustible material.

Heavier unconsumed portions fall onto a bed of sand 124 immediately below and heated by the flame, so that they have some time to reduce to ash under the heat of flame immediately above it.

The bed of sand is carried in a car 126 with an open top having a sump 128 and wheels 130 at the bottom so that it can be rolled out for cleaning periodically.

Vaporized material and fumes, including flue gases, pass through the only free opening 132 in the chamber and then through duct 134 through the chemical spray 52 in duct 54 in common with vapors from the previously described part 18 of the system and then through the air and filter and wash sections and out to the atmosphere.

Vat 74 extends under these sections as previously noted and material collected is returned to the mixing section of the first noted material portion for further processing through the system.

FIG. 3 shows a sectional view and FIG. 4 an elevational view of preferred structure for at least one of the filters 364 of the system. Instead of being of conventional metal mesh or fibreglass as in FIGS. 1 and 2, this structure provides for liquid-spray use as a filter without a filter matrix. The liquid spray can be a water spray or a chemical spray of the type mentioned in my copending application, or can be an oily waste solvent. Frame 366, which is a tubular loop, can be generally rectangular or can be circular to fit the duct in which installed. It preferably is of generally rectangular cross section and has a series of holes 368 along the inner centerline of each side (or of the inner periphery if circular). The frame is preferably of corrosion-resistant metal such as stainless steel, able to stand a pressure sufficient to project liquid received through conduit 370 entirely across the frame (arrows) to impact on the opposite side and splash back to some appreciable extent both vertically and horizontally regardless of whether used in horizontal or vertical orientation and regardless of gas flow of several feet per minute through the opening in the filter. The filter is thus of low resistance to gas flow but efficient because of the divergence of spray produced by the slot-like openings which covers entire filter area. The liquid connection 372 is preferably on the side away from the handle 374 permitting sliding the filter away from the conduit to inspect it. Maintenance is made to be a minimum with this filter because of the non-clogging-by filtrate aspect. Any conventional means can be used to clamp the conduit to the integral filter liquid connection such as a strap 376 which may be released by cutting box-strapping machine use simply replaces the strap.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for concurrently treating both flammable and nonflammable waste material, including in sequence: means for mixing waste material with liquid, means for heating waste material when mixed with liquid and reducing at least a portion thereof to gaseous material, means for forcing said gaseous material to flow, means for treating said flowing gaseous material with liquid, means for filtering said flowing gaseous material, and means for recycling through the system filtrate from said filtering, the improvement comprising: the means for heating including means for projecting flame horizontally in a chamber and means for spraying said waste material mixed with liquid onto said flame substantially counter to the direction of said flame projection; the means for mixing include first means for mixing liquid with nonflammable waste and second means for mixing liquid with flammable waste, wherein the means for heating include a heated plate and means for spraying nonflammable waste onto the heated plate; wherein means for continuing combustion of waste material sprayed onto said flame is provided, said means for continuing combustion comprising a bed of sand under said flame in position for receiving waste material falling through the flame and in proximity to the flame promoting continued combustion; a car supporting the bed of sand and means for rolling the car from beneath said flame to a cleanout location; a first chamber around said heated plate; a second chamber around said flame and the means for forcing including each of said first and second chamber being an enclosure limiting outward flow of gaseous material to a single exhaust therefrom; said means for treating flowing gaseous material including chemical spray means disposed in the path of said flowing gaseous material; said means for forcing further including fanning means for inducing said waste material to flow; said means for treating including first and second filtering means and means spraying liquid at said first and second filter means; a sump, the first filtering means being vertically disposed and said liquid sprayed having means for carrying any filtrate downward into said sump; an upright duct having exhaust to the atmosphere, the second filtering means mounted horizontally across said upright duct in position for said gaseous material to flow upward therethrough and said means spraying liquid disposed for spraying liquid downwardly through said second filtering means counter to said flow of gaseous materials and into said sump; and the means for recycling having connection for returning all said filtrate from the sump to said first mixing means.

2. A system as recited in claim 1, said means spraying liquid including at least one of said first and second filtering means consisting of a tubular loop with a series of holes in the inner perimeter, and means for forcing liquid through said holes and entirely across said tubular loop.

3. A system as recited in claim 2, said means for forcing liquid including a releasible supply-connection on a first side of the filtering means, means slidably mounting the filtering means, and a handle on a second side of the filtering means opposite said first side for slidably pulling the filtering means free upon release of said releasible supply connection.

* * * * *